United States Patent [19]

Tanaka et al.

[11] Patent Number: 4,525,554
[45] Date of Patent: Jun. 25, 1985

[54] PROCESS FOR POLYMERIZING OLEFIN

[75] Inventors: Toru Tanaka, Komae; Kazutoshi Iwatani, Hadano; Nobuo Enokido, Tokyo; Atsushi Murakami, Kawasaki; Yukio Yamaguchi, Tokyo, all of Japan

[73] Assignee: Mitsubishi Chemical Industries Ltd., Tokyo, Japan

[21] Appl. No.: 240,480

[22] Filed: Mar. 4, 1981

[51] Int. Cl.³ .................... C08F 4/02; C08F 10/00
[52] U.S. Cl. .................... 526/124; 502/104; 502/111; 502/133; 502/134; 526/125; 526/348.6; 526/352
[58] Field of Search .......... 252/431 R; 526/124, 526/125; 502/104, 133, 134

[56] References Cited

U.S. PATENT DOCUMENTS

| 3,901,863 | 8/1975 | Berger et al. | 526/124 |
| 4,109,071 | 8/1978 | Berger et al. | 526/124 |
| 4,226,964 | 10/1980 | Tanaka et al. | 526/124 |

Primary Examiner—Edward J. Smith
Attorney, Agent, or Firm—Oblon, Fisher, Spivak, McClelland & Maier

[57] ABSTRACT

In a process for polymerizing an olefin in the presence of a catalyst system combining an organoaluminum compound with a hydrocarbon insoluble solid catalytic component prepared by treating a hydrocarbon solution containing a magnesium compound, and a titanium compound with an aluminum halide having the formula $$AlR^1_l X^1_{3-l}$$

($R^1$ represents an alkyl, aryl or cycloalkyl group and $X^1$ represents a halogen atom, and $l$ is $1 \leq l \leq 2$), an improvement characterized in that the magnesium compound is a compound having the formula $$Mg(OR^2)_m X^2_{2-m}$$

($R^2$ represents an alkyl, aryl or cycloalkyl group; $X^2$ represents a halogen atom; and $m$ is 1 or 2) and the titanium compound is a compound having the formula $$Ti(OR^3)_n X^3_{4-n}$$

($R^3$ represents an alkyl, aryl or cycloalkyl group; $X^3$ represents a halogen atom; n is 1, 2 or 3).

12 Claims, No Drawings

PROCESS FOR POLYMERIZING OLEFIN

DETAILED DESCRIPTION OF THE INVENTION

The present invention relates to a process for polymerizing an olefin. More particularly, it relates to a process for polymerizing an olefin in the presence of a novel catalyst system comprising a magnesium compound and a titanium compound.

It has been known to use a catalyst system containing a magnesium compound and a titanium compound in a polymerization of an olefin. For example, it has been proposed to use a catalyst system obtained by reacting magnesium diethoxide and titanium tetrabutylate with ethylaluminum dichloride in Japanese Unexamined Patent Publication No. 54889/1976 and it has been proposed to use a catalyst system obtained by reacting an acid halide with a hydrocarbon insoluble solid obtained by reacting magnesium diethoxide with a halogen-containing titanium compound in Japanese Unexamined Patent Publication No. 82395/1979. High polymerization activity has been attained by polymerizing an olefin in the presence of such catalyst system.

The inventors have studied and found that the activity of the catalyst for the polymerization can be further improved by preparing a homogeneous hydrocarbon solution containing the magnesium compound and the titanium compound by using the specific titanium compound and then, treating with an organoaluminum halide.

The present invention is to provide a process for polymerizing an olefin in the presence of a catalyst system combining an organoaluminum compound with a hydrocarbon insoluble solid catalytic component prepared by treating a hydrocarbon solution containing a magnesium compound, and a titanium compound, with an aluminum halide having the formula $$AlR^1_l X^1_{3-l}$$

($R^1$ represents an alkyl, aryl or cycloalkyl group and $X^1$ represents a halogen atom, and l is $1 \leq l \leq 2$) wherein the magnesium compound is a compound having the formula $$Mg(OR^2)_m X^2_{2-m}$$

($R^2$ represents an alkyl, aryl or cycloalkyl group; $X^2$ represents a halogen atom; and m is 1 or 2) and the titanium compound is a compound having the formula $$Ti(OR^3)_n X^3_{4-n}$$

($R^3$ represents an alkyl, aryl or cycloalkyl group; $X^3$ represents a halogen atom; and n is 1, 2 or 3).

The magnesium compound is a compound having the formula $$Mg(OR^2)_m X^2_{2-m}$$

($R^2$ represents an alkyl, aryl or cycloalkyl group; $X^2$ represents a halogen atom; and m is 1 or 2).

Suitable magnesium compounds include the magnesium compounds having the formula wherein $R^2$ is an alkyl, aryl or cycloalkyl group having 1 to about 15 of carbon atoms such as methyl, ethyl, propyl, butyl, pentyl, hexyl, octyl, phenyl, tolyl, xylyl, and cyclohexyl groups; and $X^2$ is chlorine, bromine or iodine atom for example, dimethoxymagnesium, diethoxymagnesium, ethoxymagnesium chloride and diphenoxymagnesium. It is especially preferable to use the magnesium compound having the formula wherein m is 2 especially diethoxymagnesium. The titanium compound is a compound having the formula $$Ti(OR^3)_n X^3_{4-n}$$

($R^3$ represents an alkyl, aryl or cycloalkyl group; $X^3$ represents a halogen atom; n is 1, 2 or 3).

In the formula, typical $R^3$ and $X^3$ are respectively the same with those of $R^2$ and $X^2$.

Suitable titanium compounds include diethoxytitanium dichloride, di-n-propoxytitanium dichloride, di-n-butoxytitanium dichloride as n=2; and triethoxytitanium monochloride, tri-n-propoxytitanium monochloride and tri-n-butoxytitanium monochloride as n=3 and ethoxytitanium trichloride as n=1.

It is preferable to use the titanium compound having the formula wherein n is 3 or 2 especially n is 3 as tri-n-butoxytitanium monochloride.

In the process of the present invention, a hydrocarbon solution containing the magnesium compound and the titanium compound is prepared.

Suitable hydrocarbons used as solvents include aliphatic hydrocarbons such as hexane and heptane; alicyclic hydrocarbons such as cyclohexane, especially aromatic hydrocarbons such as benzene, toluene and xylene.

In the preparation of the hydrocarbon solution, the magnesium compound, and the titanium compound, are preferably mixed to form a homogeneous solution. Sometimes, a homogeneous mixture can be obtained by mixing the two components and heating the mixture, however, it is preferable to dissolve them in an alcohol when a homogeneous mixture is not formed.

The alcohols can be ethanol, n-propanol, n-butanol, n-pentanol and n-octanol etc.

The order of the mixing of these two components is not critical and can be selected as desired.

A homogeneous mixture or alcohol solution can be obtained by mixing them and preferably heating at 100° C. to 170° C.

Then, a hydrocarbon is added to prepare the hydrocarbon solution. When an alcohol is used, it is possible to remove the alcohol by a distillation etc.

In the process of the present invention, the hydrocarbon insoluble solid catalytic component is prepared by treating the hydrocarbon solution with an aluminum halide having the formula $$AlR^1_l X^1_{3-l}$$

($R^1$ is an alkyl, aryl or cycloalkyl group; and $X^1$ is a halogen atom and l is $1 \leq l \leq 2$).

In the formula, typical $R^1$ and $X^1$ are respectively the same with those of $R^2$ and $X^2$.

The organoaluminum compounds can be methylaluminum dichloride, methylaluminum sesquichloride, dimethylaluminum monochloride, ethylaluminum dichloride, ethylaluminum sesquichloride, diethylaluminum monochloride, isobutylaluminum dichloride, isobutylaluminum sesquichloride and diisobutylaluminum monochloride, especially ethylaluminum dichloride, ethylaluminum sesquichloride and diethylaluminum monochloride. The optimum effect is attained by using ethylaluminum sesquichloride.

The treatment with the organoaluminum halide can be carried out by adding an organoaluminum halide to the hydrocarbon solution to react them preferably at 20° C. to 100° C. The hydrocarbon insoluble solid is separated and washed with hydrocarbon solvent. The amounts of these components are selected to give $X^1$, $X^2$, $OR^2$, $OR^3$, Mg and Ti in the formulas in molar ratios so as to satisfy the following equations:

$$1 \leq Mg/Ti \leq 4 \text{ preferably}$$
$$2 \leq Mg/Ti \leq 3;$$

$$1 \leq \frac{X^1 + X^2 + X^3}{OR^2 + OR^3} \leq 4 \text{ preferably}$$

$$1.5 \leq \frac{X^1 + X^2 + X^3}{OR^2 + OR^3} \leq 3.$$

The catalyst having high catalytic activity can be obtained in said ranges.

The cocatalyst of the organoaluminum compound is a compound having the formula $$AlR_p^4 X_{3-p}^4$$

($R^4$ is an alkyl, aryl or cycloalkyl group; $X^4$ is a halogen atom and p is 1 to 3).

In the formula, typical $R^4$ and $X^4$ respectively the same with those of $R^2$ and $X^2$.

Suitable organoaluminum compounds include trialkylaluminums such as triethylaluminum, tri-n-propylaluminum and triisobutylaluminum.

It is preferable to give a ratio of the organoaluminum compound to the hydrocarbon insoluble solid catalytic component as an atomic ratio of Al/Ti of 0.1 to 100 preferably 1 to 20.

The polymerization of an olefin is carried out in the presence of the resulting catalyst system.

Suitable olefins include α-olefins such as ethylene, propylene, butene-1, pentene-1 and octene-1. It is possible to copolymerize two or more olefins.

The process of the present invention is preferably applied for preparing ethylene homopolymer or ethylene copolymer having not more than 20 wt. % preferably not more than 10 wt. % of the other α-olefin.

The polymerization of an olefin can be a solution polymerization, a slurry polymerization in an inert solvent, or a gaseous polymerization in the absence of a solvent.

Suitable inert solvents include aliphatic hydrocarbons such as pentane, hexane, heptane, octane, isooctane, cyclohexane and aromatic hydrocarbons such as benzene, toluene, etc.

The polymerization of an olefin is usually conducted at the temperature of the room temperature to 250° C. The pressure in the polymerization is usually in a range of the atmospheric pressure to 200 atm.

When hydrogen is introduced into the polymerization zone, the effect for controlling the molecular weight by hydrogen is remarkably high to easily obtain the polymer having suitable molecular weight.

An amount of hydrogen is dependent upon the condition of polymerization and molecular weight of the object polyolefin and it should be selected depending upon these factors.

As described above, the advantages of the present invention is to use the novel catalyst having high catalytic activity and to give high productivity and to obtain a polymer having remarkably narrow molecular weight distribution.

The polymer obtained by the process of the present invention using the hydrocarbon soluble component among the reaction products of the magnesium compound and the titanium compound has the advantage that a fish-eye is not usually formed.

The invention will further illustrated by certain Examples which are provided herein for purpose of illustraton only and are not intended to be limiting in any manner unless otherwise specified.

In the Examples, the polymerization activity of the catalyst, K value was given as K=(g-polymer/g-catalyst×hr.×olefin pressure Kg/cm²) and the melt index MI is measured by the method of ASTM D-1238-57T under a load of 2.16 Kg. at 190° C.

The molecular weight distribution is rated by the flow ratio (hereinafter referring to as FR) which corresponds to the shear stress dependency of melt viscosity which is shown by the ratio of melt indexes measured at shear stresses of $10^6$dyne/cm² and $10^5$dyne/cm² according to ASTM-D-1238-57T. When a flow ratio (FR) is high, a molecular weight distribution is wide whereas when it is low, a molecular weight distribution is narrow.

EXAMPLES 1 to 4

Diethoxymagnesium, tri-n-butoxytitanium monochloride, and n-butanol were mixed at ratios shown in Table 1 and each mixture was stirred at 140° C. for 4 hours, and then, butanol was removed at 140° C. under passing nitrogen gas flow and each reaction mixture was cooled to 60° C. and benzene in an amount shown in Table 1 was added to form a homogeneous solution. Then ethylaluminum sesquichloride in an amount shown in Table 1 was added dropwise to the solution at 60° C. and each mixture was stirred at 65° C. for 1 hour. The resulting precipitate was washed with n-hexane and dried to obtain each catalyst.

In a 2 liter autoclave, 1,000 cc of n-hexane was charged and 5 mg. of the catalyst powder was added. The autoclave was heated to 90° C. and hydrogen was fed to the pressure of 1.5 Kg./cm² and 0.8 m mole of triethylaluminum was fed together with ethylene to give a total pressure of 5 Kg./cm². A consumption of ethylene was resulted during the time feeding ethylene. Additional ethylene was fed to maintain a total pressure of 5 Kg./cm² and the polymerization was stopped by adding ethanol under the pressure after 1 hour. The results are shown in Table 1.

EXAMPLES 5 and 6

In accordance with the process of Example 1 to 4 except that n-butanol was not used to prepare each hydrocarbon solution having the components shown in Table 1 and the solution was treated with ethylaluminum sesquichloride to obtain each solid powder, a polymerization of ethylene was carried out by using 5 mg. of the solid powder. The results are shown in Table 1.

EXAMPLES 7 and 8

In accordance with the process of Example 1 except that ethylaluminum dichloride or diethylaluminum monochloride was used at the ratio shown in Table 1 instead of ethylaluminum sesquichloride, each solid powder was obtained and a polymerization of ethylene was carried out by using 5 mg. of the solid powder. The results are shown in Table 1.

EXAMPLES 9 and 10

In accordance with the process of Example 5 except that ethylaluminum sesquichloride was added dropwise at 20° C. in Example 9 and 100° C. in Example 10, each solid powder was obtained and a polymerization of ethylene was carried out by using 5 mg. of the solid powder. The results are shown in Table 1.

EXAMPLE 11

In accordance with the process of Example 1 except that the reaction temperature was changed from 90° C. to 70° C. and butene-1 was added in the feeding and the additional feeding of ethylen to give a molar ratio of butene-1 to ethylene of 0.06 in the gaseous phase during the polymerization, a copolymerization of ethylene and butene-1 was carried out. The result is shown in Table 1. The resulting polymer was a copolymer of ethylene-butene-1 having 1 mol % of butene-1 units.

EXAMPLE 12

In a 2 liter autoclave, 1,000 ml of n-hexane was charged and 5 mg. of the solid powder obtained in Example 1 was charged. The mixture was heated at 90° C. and hydrogen was fed to a pressure of 21 Kg./cm$^2$ and 0.08 m mol of triethylaluminum was fed together with ethylene to give a total pressure of 26 Kg./cm$^2$. A consumption of ethylene was resulted during the time feeding ethylene. Additional ethylene was fed to maintain a total pressure of 26 Kg./cm$^2$ and the polymerization was carried out for 34 minutes. During the time, 193 g. of ethylene was polymerized. The temperature was reduced to 70° C. and ethylene and hydrogen were purged to give a total pressure of 0.4 Kg./cm$^2$ and then, 12 g. of butene-1 was fed together with additional feeding of ethylene to maintain a total pressure of 2.0 Kg./cm$^2$ for 68 minutes. The polymerization was stopped by compress-feeding ethanol to obtain 386 g. of a copolymer of ethylene and butene-1. The resulting polymer was pelletized by an extruder.

The pellets had MI of 0.03 and FR of 95. According to the infrared spectrography analysis, 0.7 mol % of butene-1 units was included. When a film was prepared by using the pellets, any fish-eye was not found.

EXAMPLE 13

Diethoxymagnesium, tri-n-butoxytitanium monochloride, and n-butanol were mixed at ratios shown in Table 1 and each mixture was stirred at 140° C. for 4 hours, and then, cooled to 60° C. and benzene in an amount shown in Table 1 was added to form a homogeneous solution. Then ethylaluminum sesquichloride in an amount shown in Table 1 was added dropwise to the solution at 60° C. and each mixture was stirred at 65° C. for 1 hour. The resulting precipitate was washed with n-hexane and dried to obtain each catalyst.

In a 2 liter autoclave, 1,000 cc of n-hexane was charged and 5 mg of the catalyst powder was added.

The autoclave was heated to 150° C. and hydrogen was fed to the pressure up to 8.0 kg/cm$^2$ and 0.8 mmol of triethylaluminum was fed together with ethylene to give a total pressure of 12 kg/cm$^2$. A consumption of ethylene was resulted during the time feeding ethylene. Additional ethylene was fed to maintain a total pressure of 12 kg/cm$^2$ and the polymerization was stopped by adding ethanol under the pressure after 1 hour. The results are shown in Table 1.

REFERENCE 1

In accordance with the process of Example 6 except that diethoxymagnesium and tri-n-butoxytitanium monochloride were not heat-treated at 140° C. and benzene was added to form a benzene slurry, a solid powder was obtained.

In accordance with the process of Example 1 except using 5 mg. of the resulting solid powder, a polymerization of ethylene was carried out to obtain 89.1 g. of polyethylene. As a result, K=6,600, $K_{Ti}$=59,400, MI=0.70 and FR=23. The product had ununiform parts as fish-eyes as the texture.

REFERENCE 2

The components used in Example 6 were used. Diethoxymagnesium was added to benzene to obtain a slurry and then, ethylaluminum sesquichloride was added at 60° C. and then, tri-n-butoxytitanium monochloride was added dropwise and the mixture was stirred at 65° C. for 1 hour. The mixture was treated as the process of Example 1 to obtain a solid powder.

In accordance with the process of Example 1 except using 5 mg. of the resulting solid powder, a polymerization of ethylene was carried out to obtain 26 g. of polyethylene. As a result, K=1,940, $K_{Ti}$=19,800, MI=0.85 and FR=22. The product had fish-eyes as the texture.

TABLE 1

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 13 |
| Mg. comp. (m mol) | 20 | 30 | 20 | 20 | 20 | 20 | 20 | 20 | 20 | 20 | 20 | 20 |
| Ti comp. (m mol) | 10 | 10 | 10 | 10 | 20 | 10 | 10 | 10 | 20 | 20 | 10 | 10 |
| Alcohol (m mol) | 40 | 60 | 40 | 40 | none | none | 40 | 40 | none | none | 40 | 10 |
| Solvent (cc) | 150 | 200 | 150 | 150 | 200 | 150 | 150 | 150 | 200 | 200 | 150 | 150 |
| Organoaluminum halide (m mol) | 87 | 113 | 133 | 40 | 120 | 87 | 65 | 130 | 120 | 120 | 87 | 107 |
| Yield of polymer (g) | 281 | 236 | 283 | 210 | 213 | 261 | 180 | 209 | 226 | 201 | 295 | 102 |
| K | 20,840 | 17,500 | 20,950 | 15,530 | 15,800 | 19,340 | 13,300 | 15,500 | 16,760 | 14,860 | 21,820 | 5,100 |
| $K_{Ti}$ | 189,450 | — | 190,690 | 194,130 | 112,860 | 176,850 | 134,500 | 167,700 | 179,900 | 135,200 | 198,560 | 46,360 |
| MI | 0.27 | 0.35 | 0.25 | 0.33 | 0.25 | 0.25 | 0.26 | 0.29 | 0.29 | 0.26 | 1.5 | 3.5 |
| FR | 23 | 23 | 23 | 22 | 23 | 23 | 23 | 22 | 22 | 23 | 21 | 19 |
| Fish-eyes | none | none | none | none | none | none | none | none | none | none | none | none |

We claim:

1. A process for polymerizing an olefin to obtain substantially narrow molecular weight distribution in the presence of a high yield catalyst system consisting essentially of the steps of combining an organo aluminum compound with a hydrocarbon insoluble solid catalytic component prepared by treating a hydrocarbon solution containing a magnesium compound and a titanium compound, with an aluminum halide having the formula $AlR_l^1 X_{3-l^1}$, wherein $R^1$ represents an alkyl, aryl or cycloalkyl group and $X^1$ represents a halogen atom, and l is $1 \leq l \leq 2$, the magnesium compound is a compound having the formula $$Mg(OR^2)_m X^2_{2-m},$$

wherein $R^2$ represents an alkyl, aryl or cycloalkyl group; $X^2$ represents a halogen atom; and m is 1 or 2; the titanium compound is a compound having the formula $$Ti(OR^3)_n X^3_{4-n},$$

wherein $R^3$ represents an alkyl, aryl or cycloalkyl group; $X^3$ represents a halogen atom; n is 1, 2 or 3; and the molar ratios of said magnesium compound, titanium compound and aluminum halide are in the ranges:

$$1 \leq Mg/Ti \leq 4$$

$$1 \leq \frac{X^1 + X^2 + X^3}{OR^2 + OR^3} \leq 4.$$

2. A process for polymerizing an olefin according to claim 1, wherein the magnesium compound is a compound having the formula $$Mg(OR^2)_2$$

and the titanium compound is a compound having the formula
$$Ti(OR^3)_3 X^3$$

3. A process for polymerizing an olefin according to claim 1, wherein the magnesium compound is diethoxymagnesium and the titanium compound is tri-n-butoxytitanium monochloride.

4. A process for polymerizing an olefin according to claim 1, wherein the aluminum halide is ethylaluminum dichloride, ethylaluminum sesquichloride or diethylaluminum chloride.

5. A process for polymerizing an olefin according to claim 1, 2, 3, or 4, wherein the magnesium compound and the titanium compound are mixed with an alcohol to form a homogeneous solution and then, the alcohol is removed and a hydrocarbon solvent is added to prepare a hydrocarbon solution.

6. A process for polymerizing an olefin according to claim 5, wherein the alcohol is n-butanol.

7. A process for polymerizing an olefin according to claim 1, wherein the hydrocarbon solvent for the hydrocarbon solution is benzene, toluene or xylene.

8. A process for polymerizing an olefin according to claim 1, wherein the organoaluminum compound is a compound having the formula $$AlR^4_p X^4_{3-p}$$

($R^4$ represents an alkyl, aryl or cycloalkyl group; $X^4$ represents a halogen atom; p is 1 to 3).

9. A process for polymerizing an olefin according to claim 8, wherein the organoaluminum is trialkylaluminum.

10. A process for polymerizing an olefin according to claim 1, wherein said olefin for the polymerization is ethylene or a mixture of ethylene and other α-olefin.

11. A hydrocarbon insoluble solid highly active catalytic component prepared by the steps consisting essentially of treating a hydrocarbon solution containing a magnesium compound and a titanium compound, with an aluminum halide having the formula $$AlR^1_l X^1_{3-l},$$

wherein $R^1$ represents an alkyl, aryl or cycloalkyl group and $X^1$ represents a halogen atom, and l is $1 \leq l \leq 2$, the magnesium compound is a compound having the formula $$Mg(OR^2)_m X^2_{2-m},$$

wherein $R^2$ represents an alkyl, aryl or cycloalkyl group; $X_2$ represents a halogen atom; and m is 1 to 2 and the titanium compound is a compound having the formula $$Ti(OR^3)_n X^3_{4-n},$$

wherein $R^3$ represents an alkyl, aryl or cycloalkyl group; $X^3$ represents a halogen atom; n is 1, 2, or 3 and the molar ratios of said magnesium compound, titanium compound and aluminum halide are in the ranges:

$$1 \leq Mg/Ti \leq 4$$

$$1 \leq \frac{X^1 + X^2 + X^3}{OR^2 + OR^3} \leq 4.$$

12. A process for preparing a hydrocarbon insoluble solid highly active catalytic component, which consists essentially of the steps of treating a hydrocarbon solution containing a magnesium compound and a titanium compound, with an aluminum halide having the formula:

$$AlR^1_l X^1_{3-l},$$

wherein $R^1$ represents an alkyl, aryl or cycloalkyl group and $X^1$ represents a halogen atom, and l is $1 \leq l \leq 2$, the magnesium compound is a compound having the formula $$Mg(OR^2)_m X^2_{2-m},$$

wherein $R^2$ represents an alkyl, aryl or cycloalkyl group; $X^2$ represents a halogen atom; and m is 1 to 2 and the titanium compound is a compound having the formula $$Ti(OR^3)_n X^3_{4-n},$$

wherein $R^3$ represents an alkyl, aryl or cycloalkyl group; $X^3$ represents a halogen atom; and n is 1, 2 or 3 and the molar ratios of said magnesium compound, titanium compound and aluminum halide are in the ranges:

$$1 \leq Mg/Ti \leq 4$$

$$1 \leq \frac{X^1 + X^2 + X^3}{OR^2 + OR^3} \leq 4.$$

* * * * *